3,223,709
DIHYDROQUINOLINE-CARBOXYLIC ACID AMIDES AND A PROCESS FOR THEIR PREPARATION

Ivar Ugi, Leverkusen, Friedrich Beck, Munich, and Ernst Böttner, Munich-Pasing, Germany, assignors to Farbenfabriken Bayer Aktiengesellschaft, Leverkusen, Germany, a corporation of Germany
No Drawing. Filed Feb. 26, 1963, Ser. No. 261,232
Claims priority, application Germany, Feb. 28, 1962, F 36,145
25 Claims. (Cl. 260—287)

This invention relates to novel 1-alkyl-3-acyl-1,4-dihydroquinoline-carboxylic acid amides, especially to 1-alkyl-3-acyl-1,4-dihydroquinoline-4-carboxylic acid amides and to a process for preparing them. More specifically the process deals with the simultaneous introduction of two substituents into the quinoline ring.

There is known no process for the preparation of these products in one step.

It has been found that 1-alkyl-3-acyl-1,4-dihydroquinoline-4-carboxylic acid amides are obtained simply if N-alkyl quinolinium salts are reacted, possibly in the presence of a solvent, with isonitriles and with salts of carboxylic acids.

It is extremely surprising that the invention makes it possible to introduce two different substituents into the quinoline nucleus, with formation of carbon-carbon bonds. It is particularly surprising that this substitution proceeds under gentle conditions.

If N-benzyl quinolinium bromide, sodium acetate and isopropyl isocyanide are reacted according to the invention, the reaction proceeds as follows:

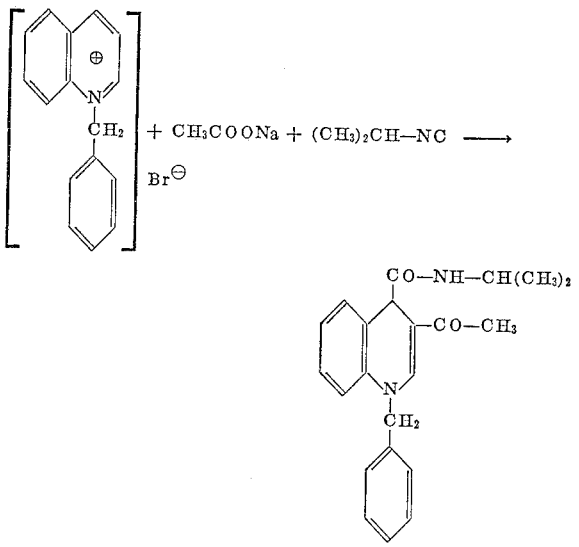

The obtained dihydroquinoline-carboxylic acid amides have the general formula

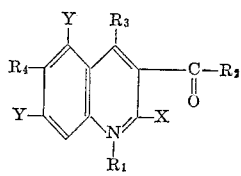

in which $R_1$ is a member of the group consisting of an alkyl and an alkaryl group, $R_2$ is a member of the group consisting of hydrogen, an alkyl, a haloalkyl, phenyl, a halophenyl and a nitrophenyl group, $R_3$ stands for a member of the group consisting of hydrogen, a carboxylic acid alkyl amide, a carboxylic acid aryl amide, a carboxylic acid cyclohexylamide and a carboxylic acid alkylaryl amide, X has the same meaning as $R_3$, one of $R_3$ and X must be hydrogen, $R_4$ is a member of the group consisting of an alkyl and an alkoxy group and Y is a halogen.

Practically any combinations of N-alkyl quinolinium ions and common anions are to be considered as N-alkyl quinolinium salts. The anion used is in principle determined by the alkylation method which has been used to produce the N-alkyl compound. The anion, therefore, is generally a halogen ion, such as chloride, bromine or iodine, or an aryl sulphonate ion, such as the p-toluene sulphate ion or an alkyl sulphonate ion such as the methyl sulphate ion. The N-alkyl quinolinium compounds can be of very different natures. All that is essential for the reaction according to the invention is that the quinoline nucleus be present and that the nitrogen atom carry an alkyl group. The radical on the nitrogen atom can be a pure alkyl group or an aralkyl group. The quinoline system can be substituted once or several times by alkyl, aryl, alkoxyl, acyl, carboxylic ester, carbonamide or cyanide radicals or by halogen atoms. It is also possible for other rings to be attached by condensation to the quinoline system.

The following are examples of the quinolinium salts that may be used: N-methyl quinolinium iodide, methyl quinolinium methyl sulphates, 6-cyano-methyl quinolinium chloride, ethyl quinolinium bromide, N-butyl quinolinium bromide, benzyl quinolinium chloride, benzyl quinolinium bromide, p-bromo-benzyl quinolinium bromide, N-ethyl-6-methoxy quinolinium bromide, 3-4-dichlorobenzyl quinolinium chloride, 4-methyl-N-methyl quinolinium iodide, N-methyl-5,6-benzo quinolinium iodide.

Many different combinations of cations and of carboxylic acid anions are to be considered as salts of carboxylic acids. Preferably employed are aliphatic, aromatic and heterocyclic carboxylic acids. Among the possible cations, the alkali metal and the trialkyl ammonium ions are preferably used.

The following are examples of salts of carboxylic acids which are especially suitable for the process according to the invention: sodium formate, potassium acetate, sodium phenyl acetate, sodium benzoate, sodium-p-chlorobenzoate, the sodium-, potassium- and tetramethyl-ammonium salts of p-benzoylamino benzoic acid and p-nitrobenzoic acid. The salts of phenoxy-acetic acid, isobutyric acid, caproic acid and of pyridine-4-carboxylic acid can also be used.

Both aliphatic and aromatic isonitriles can be used in the reaction according to the invention; the following are especially suitable: ethyl, isopropyl, n-butyl, t-butyl, cyclohexyl, phenyl, p-methoxyphenyl and p-dimethylamino phenyl isocyanides.

Any inert organic solvent can be used as diluent, but it is preferred to employ mixtures of water and water-miscible organic solvents. Suitable are low aliphatic alcohols, acetone, ethers such as dioxene and tetrahydrofuran, glycols and glycol ethers, more especially ethylene glycol monomethyl ether. A preferred solvent is aqueous methanol.

The reaction according to the invention is preferably carried out at temperatures from 0 to 180° C. advantageously from 10 to 150° C.

0.5 to 5 mols, advantageously approximately 1 mol of carboxylic acid salt, and 0.5 to 2 mols, advantageously 0.9 to 1 mol, of isonitrile, are used to 1 mol of quinolinium salt. When working in solution, it is expedient to employ the highest possible concentrations.

The process according to the invention can be carried out by combining all the reactants, and possibly the solvents, and keeping them for some time at the reaction temperature. Working up is carried out by the usual methods. The product usually crystallises out and can then be suction-filtered directly.

The process according to the invention has many advantages. It provides a single-stage synthesis of new substances which could otherwise only be produced with difficulty in multi-stage syntheses. Furthermore, the substituents are introduced into the quinoline nucleus under extremely gentle conditions.

The products which can be obtained according to the invention are new and are valuable intermediates in the production of plant-protection agents, textile auxiliaries, brighteners and fluorescent dyestuffs. They can also be used directly as brighteners.

*Example 1*

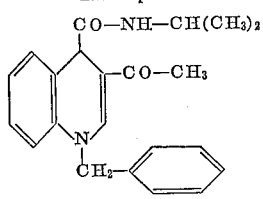

28.5 g. of N-benzyl quinolinium bromide, 15.0 g. of sodium acetate and 7.0 g. of isopropyl isocyanide are dissolved in the smallest possible quantity of aqueous methanol (1:1). The solution is left to stand for 8 weeks at 20° C. A crystalline deposit forms and is suction-filtered. There are obtained 15.4 g. of 1-benzyl-3-acetyl-1,4-dihydroquinoline-4-carboxylic acid isopropyl amide (=44% of the theoretical); M.P. 205 to 208° C.

*Example 2*

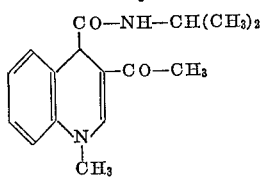

9.0 parts by weight of N-methyl quinolinium iodide, 4.0 parts by weight of anhydrous sodium acetate and 2.5 parts by weight of isopropyl isocyanate are dissolved in 35 parts by weight of 50% aqueous methanol. After standing for 3 weeks at about 20° C., the substance is suction-filtered and recrystallised from isopropanol. Yield: 4.3 parts by weight of 1-methyl-3-acetyl-1,4-dihydroquinoline-4-carboxylic acid isopropyl amide of melting point 205 to 210° C.; the melting point of the pure compound is 224 to 225°.

*Example 3*

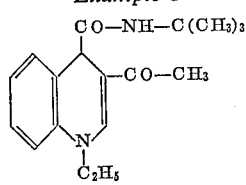

2.56 parts by weight of N-ethyl quinolinium bromide, 1.20 parts by weight of anhydrous sodium acetate and 0.83 part by weight of t-butyl isocyanide are dissolved in 30 parts by weight of methanol/water (1:1) and left to stand for 4 weeks at approximately 20° C. (Instead of methanol it is also possible to use ethylene glycol monomethyl, ether tetrahydrofuran, dioxane or acetonitrile.) The product is suction-filtered. Yield: 0.94 part by weight of 1-ethyl-3-acetyl-1,4-dihydroquinoline-4-carboxylic acid tert.-butylamide of melting point 174 to 177° C. (melting point of pure material 184 to 185°).

*Example 4*

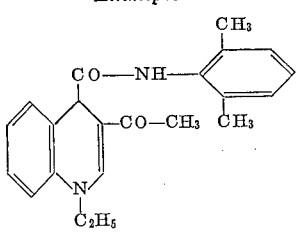

2.56 parts by weight of N-ethyl quinolinium bromide, 1.0 part by weight of anhydrous soduim acetate and 1.31 parts by weight of 2,6-dimethyl phenyl isocyanide are dissolved in 20 parts by weight of methanol/water (6:4). After heating on a water bath for 5 days the substance is allowed to cool and is suction-filtered. Yield: 1.40 parts by weight of 1-ethyl-3-acetyl-1,4-dihydroquinoline-4-carboxylic acid-2′,6′-xylidide with melting point 176 to 188° C.; M.P. 227 to 228° C. after recrystallisation from ethanol/water.

*Example 5*

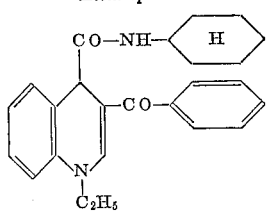

5 parts by weight of N-ethyl quinolinium bromide, 3 parts by weight of sodium benzoate and 2.2 parts by weight of cyclohexyl isocyanide are dissolved in 30 parts by weight of methanol/water (1:1) and left to stand for 4 weeks at approximately 20° C. By suction-filtering and crystallisation from carbon tetrachloride, there are obtained 2.5 parts by weight of 1-ethyl-3-benzoyl-1,4-dihydroquinoline-4-carboxylic acid cyclohexyl amide of melting point 186 to 187° C.

*Example 6*

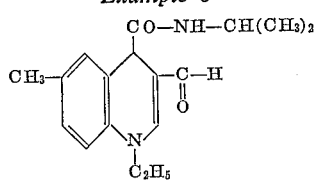

2.70 parts by weight of N-ethyl-6-methyl quinolinium bromide, 1.32 parts by weight of sodium formate and 0.69 part by weight of isopropyl isocyanide are dissolved in 15 parts by weight of aqueous methanol (1:1) and left to stand for 5 weeks at 0 to 20° C. It is suction-filtered, dissolved and allowed to crystallise from dimethyl formamide. Yield: 1.08 parts by weight of 1-ethyl-3-formyl-1,4-dihydro-6-methyl-quinoline-4-carboxylic acid isopropyl amide of melting point 215 to 218° C.

*Example 7*

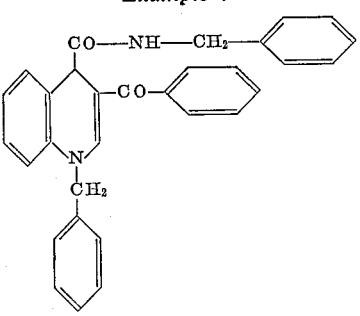

3.0 parts by weight of N-benzyl quinolinium bromide, 1.5 parts by weight of sodium benzoate and 1.2 parts by weight of benzyl isocyanide in 15 parts by weight of 50% aqueous methanol are left to stand for 12 days at 15 to 25° C. The product is suction-filtered and recrystallised from isopropanol. Yield: 3.0 parts by weight of 1-benzyl-3-benzoyl-1,4-dihydroquinoline-4-carboxylic acid-benzyl-amide of melting point 170 to 180° C.; melting point of the pure compound is 181.5 to 182.5° C.

*Example 8*

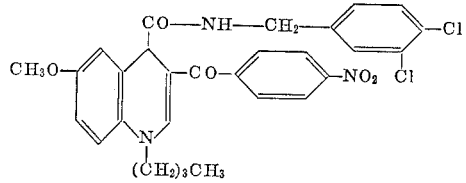

2.2 parts by weight of N-n-butyl-6-methoxy-quinolinium bromide, 1.9 parts by weight of sodium-p-nitrobenzoate and 1.85 parts by weight of 3,4-dichlorobenzyl isocyanide in 30 parts by weight of aqueous methanol are allowed to react for 4 weeks at 20 to 40° C. The product is suction-filtered in the cold and recrystallised from dimethyl formamide. Yield: 0.78 part by weight of 1-n-butyl-3-p-nitrobenzoyl-1,4-dihydro - 6 - methoxy - 1,4 - dihydroquinoline-4-carboxylic acid-(3',4'-dichlorobenzyl)-amide of melting point 224 to 228° C. (dec.).

*Example 9*

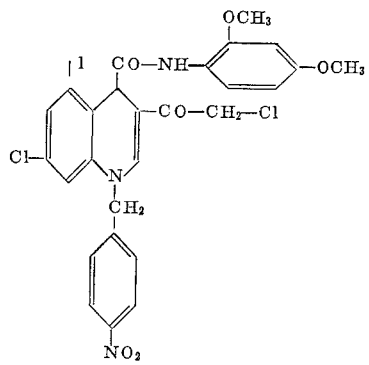

4.3 parts by weight of N-(p-nitrobenzyl)-5,7-dichloroquinolinium bromide, 1.2 parts by weight of sodium chloroacetate and 1.6 parts by weight of 2,4-dimethoxy-phenyl isocyanide in 30 parts by weight of 50% aqueous methanol are allowed to react for 3 weeks at 20 to 40° C. The product is suction-filtered and recrystallised from dimethyl formamide. Yield: 0.30 part by weight of 1-(p-nitrobenzyl)-3 - chloracetyl - 5,7 - dichloro - 1,4 - dihydroquinoline-4-carboxylic acid - (2',4' - dimethoxyphenyl)-amide of melting point 238 to 242° C. (with decomposition).

What we claim is:

1. 1-benzyl-3-acetyl-1,4 - dihydroquinoline-4-carboxylic acid isopropyl amide.
2. 1-methyl-3-acetyl-1,4 - dihydroquinoline-4-carboxylic acid isopropylamide.
3. 1-ethyl-3-acetyl - 1,4 - dihydroquinoline-4-carboxylic acid-tert. butylamide.
4. 1-ethyl-3-acetyl - 1,4 - dihydroquinoline-4-carboxylic acid-2',6'-xylidide.
5. 1-ethyl-3-benzoyl-1,4 - dihydroquinoline-4-carboxylic acid cyclohexyl amide.
6. 1-ethyl-3-formyl-1,4 - dihydro-6-methyl-quinoline-4-carboxylic acid isopropyl amide.
7. 1-benzyl-3-benzoyl-1,4 - dihydroquinoline-4-carboxylic acid benzyl-amide.
8. 1-n-butyl-3-p-nitrobenzoyl - 1,4-dihydro-6-methoxy-quinoline-4-carbocylic acid-(3',4'-dichlorobenzyl)-amide.
9. 1-(p-nitrobenzyl)-3 - chloroacetyl - 5,7-dichloro-1,4-dihydroquinoline-4 - carboxylic acid-2',4'-dimethoxyphenyl)-amide.
10. A process according to claim 11 in which the reaction is carried out in a liquid medium at a temperature of about 0° C. to about 180° C.
11. A dihydroquinoline-carboxylic acid amide having the formula

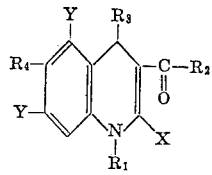

wherein $R_1$ is a member selected from the group consisting of methyl, ethyl, butyl, benzyl, and p-nitrobenzyl; $R_2$ is a member selected from the group consisting of hydrogen, methyl, phenyl, p-nitrophenyl, and chloro methyl; $R_3$ is a member selected from the group consisting of carboxylic acid isopropyl amide, carboxylic acid cyclohexyl amide, carboxylic acid xylenyl amide, carboxylic acid benzyl amide, carboxylic acid methoxy benzyl amide, and carboxylic acid chloro benzyl amide; $R_4$ is a member selected from the group consisting of hydrogen, methyl and methoxy; and Y is a member selected from the group consisting of hydrogen and chlorine.

12. A process according to claim 11, in which said isonitrile is isopropyl isocyanide.
13. A process according to claim 11, in which said isonitrile is tert.-butyl isocyanide.
14. A process according to claim 11, in which said isonitrile is 2,6-dimethyl phenyl isocyanide.
15. A process according to claim 11, in which said isonitrile is cyclohexyl isocyanide.
16. A process according to claim 11, in which said isonitrile is benzyl isocyanide.
17. A process according to claim 11, in which said isonitrile is 3,4-dichlorobenzyl isocyanide.
18. A process according to claim 11, in which said isonitrile is 2,4-dimethoxy-phenyl isocyanide.
19. A process according to claim 11, in which said alkali salt of a carboxylic acid is sodium acetate.
20. A process according to claim 11, in which said alkali salt of a carboxylic acid is sodium benzoate.
21. A process according to claim 11, in which said alkali salt of a carboxylic acid is sodium formate.
22. A process according to claim 11, in which said alkali salt of a carboxylic acid is sodium-p-nitrobenzoate.
23. A process according to claim 11, in which said alkali salt of a carboxylic acid is sodium chloro-acetate.
24. A process for preparing dihydroquinoline carboxylic acid amides which comprises reacting a quinoline salt having the formula

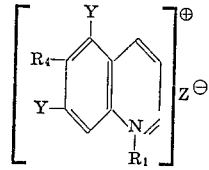

wherein $R_1$ is a member selected from the group consisting of methyl, ethyl, butyl, benzyl, and p-nitrobenzyl; $R_4$ is a member selected from the group consisting of hydrogen, methyl and methoxy; Y is a member selected from the group consisting of hydrogen and chlorine; and Z is a member selected from the group consisting of chlorine, bromine and iodine with an isonitrile of the formula

wherein R is a member selected from the group consisting of alkyl having 1–6 carbon atoms, phenyl, chlorophenyl, nitrophenyl, methoxy phenyl, cyclohexyl, benzyl, chlorobenzyl, nitrobenzyl, methoxybenzyl and xylenyl in the presence of an alkali salt of a carboxylic acid having the formula

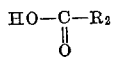

wherein $R_2$ is a member selected from the group consisting of hydrogen, methyl, phenyl, p-nitrophenyl, and chloromethyl, and recovering the dihydroquinoline carboxylic acid amide thereby formed.

25. A process for preparing dihydroquinoline carboxylic acid amides which comprises reacting a quinoline salt having the formula

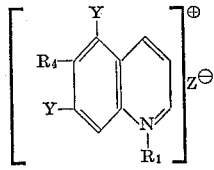

wherein $R_1$ is a member selected from the group consisting of methyl, ethyl, butyl, benzyl, and p-nitrobenzyl; $R_4$ is a member selected from the group consisting of hydrogen, methyl and methoxy; Y is a member selected from the group consisting of hydrogen and chlorine; and Z is a member selected from the group consisting of chlorine, bromine and iodine with an isonitrile of the formula

wherein R is a member selected from the group consisting of alkyl having 1–6 carbon atoms, phenyl, chlorophenyl, nitrophenyl, methoxy phenyl, cyclohexyl, benzyl, chlorobenzyl, nitrobenzyl, methoxybenzyl and xylenyl in the presence of an alkali salt of a carboxylic acid having the formula

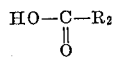

wherein $R_2$ is a member selected from the group consisting of hydrogen, methyl, phenyl, p-nitrophenyl, and chloromethyl under the reaction conditions, including a liquid medium selected from the group consisting of water, aliphatic alcohols, ketones, ethers, and mixtures thereof and a temperature of 10° C. to 150° C. and thereafter recovering the formed dihydroquinoline carboxylic acid amide from the reaction mixture.

References Cited by the Examiner
UNITED STATES PATENTS 2,992,218  7/1961  Buell et al. _____ 260—301.2
3,005,779  10/1961  Ackermann et al. __ 260—301.2

NICHOLAS S. RIZZO, *Primary Examiner.*

WALTER A. MODANCE, *Examiner.*